United States Patent [19]

Funke

[11] 3,887,210

[45] June 3, 1975

[54] DOWNHILL RACING CART
[75] Inventor: Peter Funke, Munich, Germany
[73] Assignee: ISPOW AG, Chur, Switzerland
[22] Filed: Jan. 4, 1974
[21] Appl. No.: 430,757

[30] Foreign Application Priority Data
Oct. 16, 1973  Germany........................... 2351938
Jan. 9, 1973  Germany........................... 2300822

[52] U.S. Cl. ................ 280/87.01; 188/5; 188/109; 280/87.01; 280/400; 280/446; 280/480
[51] Int. Cl....................... B62b 11/00; F16d 63/00
[58] Field of Search ......... 280/1.1 R, 106 R, 87.01, 280/87.02 R, 480, 446; 188/5, 109

[56] References Cited
UNITED STATES PATENTS
1,464,465  8/1923  Baechle ................................. 188/5
2,259,924  10/1941  Connolly............................ 188/109
2,869,686  1/1959  Glanz.................................. 188/109
2,919,139  12/1959  Rupp.................................. 280/106 R
3,022,846  2/1962  Thompson ....................... 280/160 R
D202,435  9/1965  Stoneburner................. 280/1.1 R X Primary Examiner—Leo Friaglia
Attorney, Agent, or Firm—Hans Berman

[57]  ABSTRACT

A downhill racing cart having a tubular steel frame and a driver's seat mounted on the frame for tilting movement about a transverse axis. When the driver tilts the seat forward, a brake plate is lowered to the surface on which the cart travels. A hook for securing a towing rope to the front of the cart moves from an operative position to a rope-releasing, inoperative position in response to engagement of the brake by the driver.

8 Claims, 11 Drawing Figures

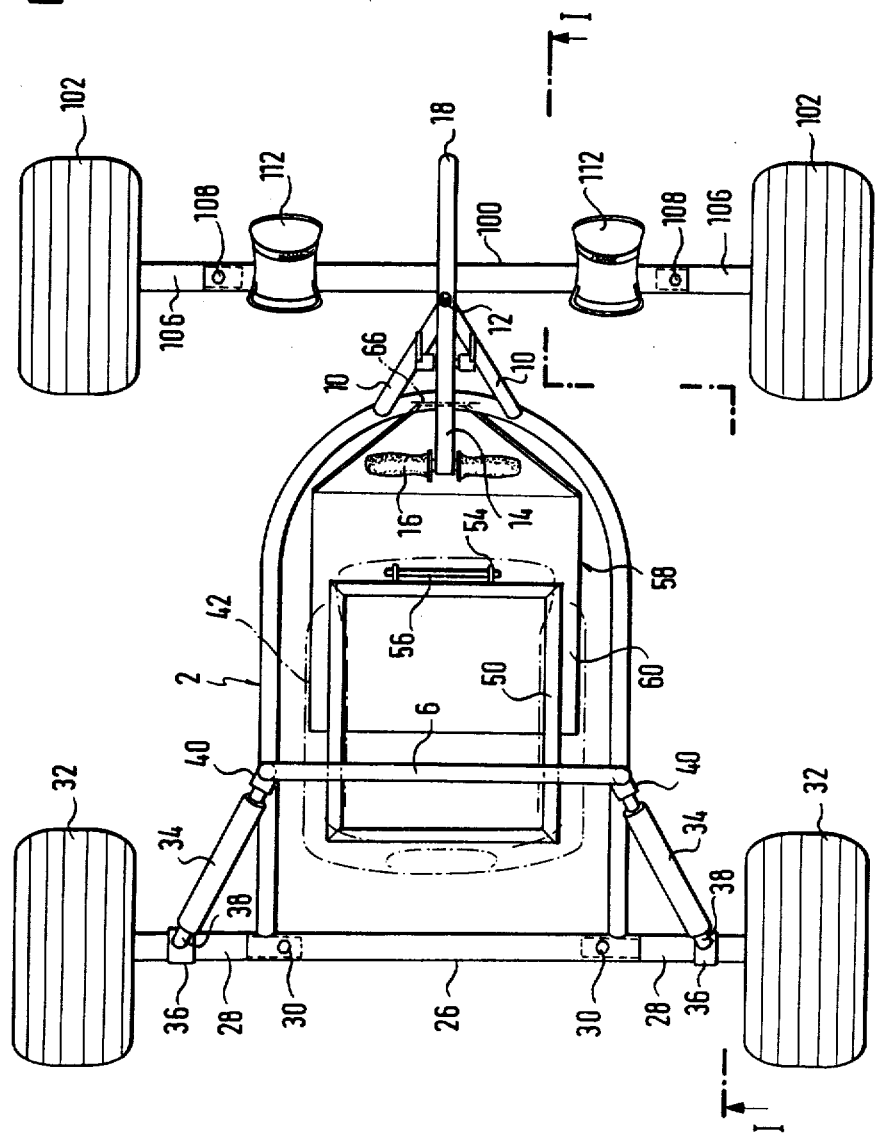

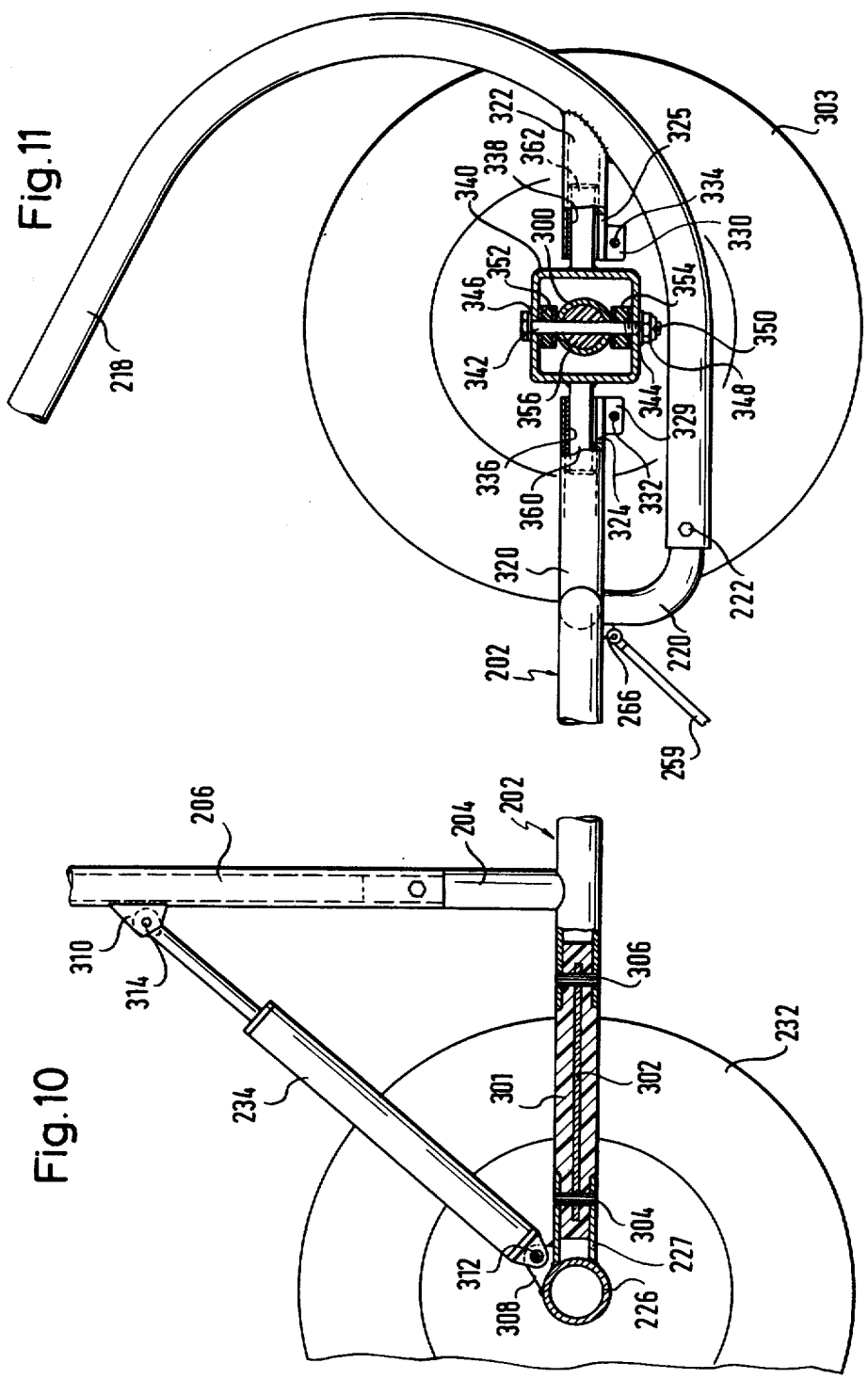

DOWNHILL RACING CART

This invention relates to downhill racing carts, and particularly to an improved racing cart equipped with a brake.

It is difficult for the driver of a light racing cart to apply a brake manually without losing control over the vehicle moving at very high speed.

It is a primary object of this invention to provide a downhill racing cart equipped with a brake that can be applied and released by the driver without shifting any portion of his body transversely of the upright median plane of the vehicle.

To achieve this object, the cart of the invention is equipped with a driver's seat mounted on the cart's frame for tilting movement about an axis transverse to the upright median plane of the frame. A braking member is mounted on the frame for movement in that plane toward and away from a position of braking engagement with the surface on which the cart travels by means of its wheels. A motion transmitting train is interposed between the driver's seat and the braking member for causing engaging and disengaging movement of the brake member in response to the tilting movement of the seat.

The seat faces in a forward direction, and the braking member is preferably mounted on the frame for pivoting movement about an axis forwardly spaced from the driver's seat.

A towing hook may be mounted on the frame and spaced in a forward direction from the driver's seat. The hook may be coupled to the braking member for pivotal movement between an inoperative and an operative position when the braking member moves toward and away from its position of engagement, the hook releasing a towing rope when in the inoperative condition.

Other features, additional objects, and many of the attendant advantages of this invention will readily be appreciated as the same becomes better understood by reference to the following detailed description of a preferred embodiment when considered in connection with the appended drawing in which:

FIG. 2 is a top plan view of the cart of FIG. 1;

FIG. 10 shows a modified rear axle assembly for the cart of the invention in side-elevational section; and FIG. 11 shows a modified front axle assembly in the manner of FIG. 10.

Figure 1:
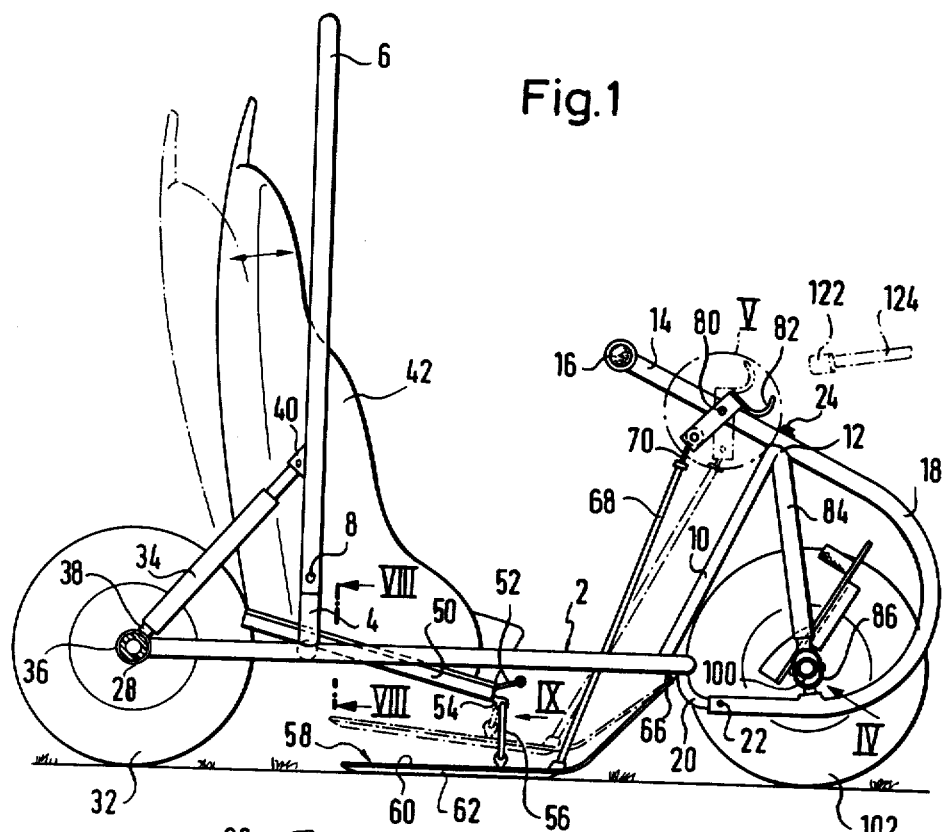
FIG. 1 shows a cart of the invention in side-elevational section on the line I—I in FIG. 2.
Figure 4:
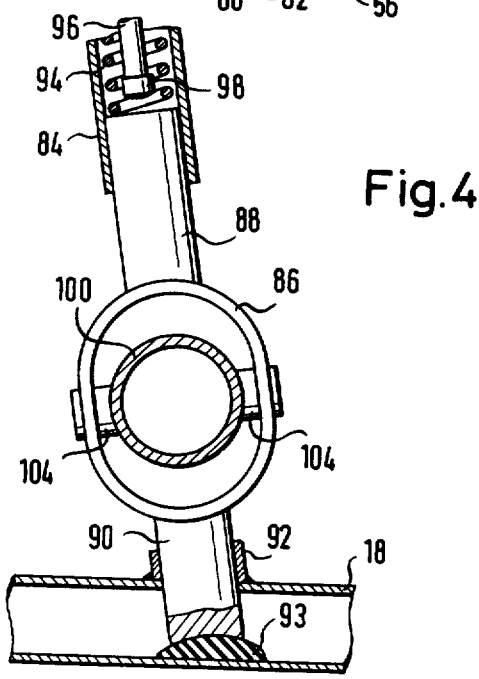
FIG. 4 illustrates the portion of the cart of FIG. 1 indicated by an arrow IV on a larger scale, and partly in section.
Figure 3:
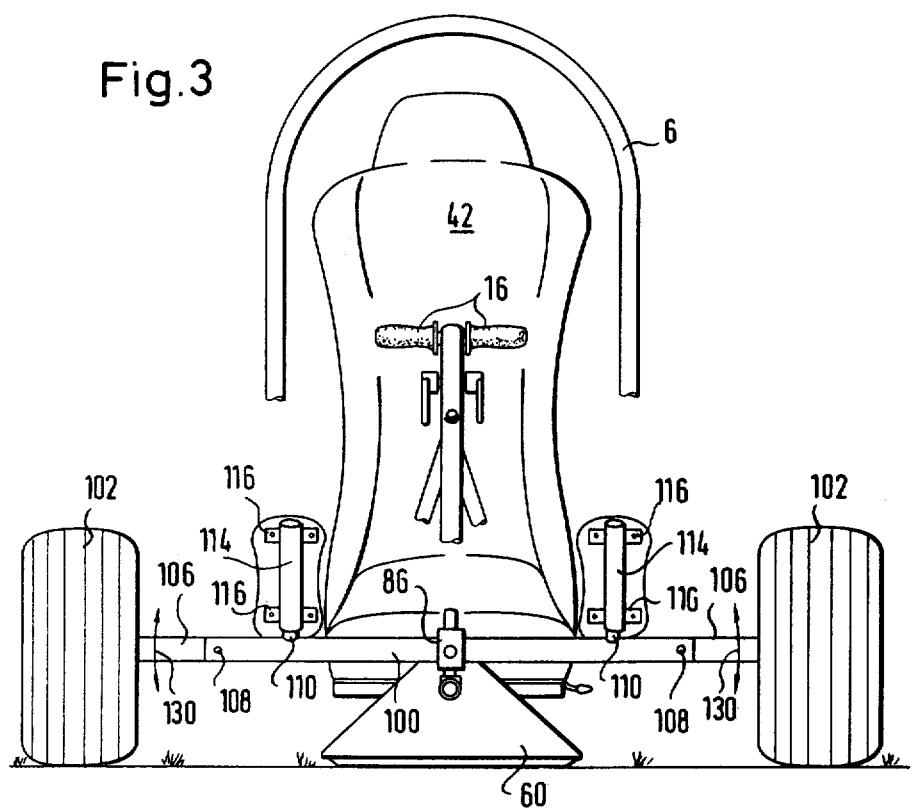
FIG. 3 shows the cart in front elevation, portions being broken away.

Referring now to the drawing in detail, and initially to FIGS. 1 and 2, there is shown a downhill racing cart whose combined frame and body consist of elongated steel elements, mostly tubular, and welded to each other as far as not specifically seated and shown otherwise.

Figure 8:
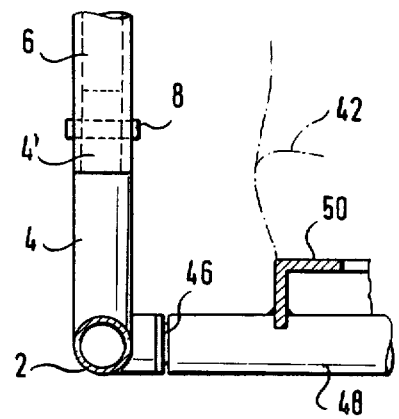
FIG. 8 shows the apparatus of FIG. 1 in enlarged, fragmentary section on the line VIII—VIII.

The main, horizontal frame element 2 is U-shaped, its bight portion being directed forward. Short, upright tubes 4 on the leg portions of the frame element 2 are releasably connected to the lower ends of a U-shaped roll-over bar 6 by a core rod 4' and a transverse pin 8, as is best seen in FIG. 8. Two struts 10 converge from the bight portion of the frame element 2 upward and forward to a welded junction 12 located in the upright median plane of the cart. Respective portions 14, 18 of a front bumper extend from the junction 12 in opposite directions in the median plane. The portion 14 is directed rearward and slightly upward and carries transverse handle bars 16. The portion 18 is arcuate. It projects forward beyond all other cart elements, and its lower end is attached to a bracket 20 on the underside of the bight portion of the frame element 2 by a releasable pin 22. The front bumper 14, 18 is releasably secured to the junction 12 by a fastener 24.

The leg portions of the frame element 2 are connected by a transverse member 26. Stub shafts 28 of somewhat resilient nylon are partly received in the two ends of the transverse member 26 and releasably secured by pins 30. The rear wheels 32 are rotatably mounted on the rear axle constituted by the transverse member 26 and the shafts 28. Pneumatic, telescoping springs 34 are attached to the shafts 28 by rings 36 on rods 38 axially projecting from the spring cylinders, while the piston rods of the springs 34 are attached to the roll-over bar 6 by pivots 40.

As is partly shown in detail in FIG. 8, a bucket seat 42 is pivoted about a transverse axis between the leg portions of the frame element 2 by means of plugs 46 horizontally projecting from the frame element 2 adjacent the upright tubes 4 into respective ends of a carrier tube 48. The rigid metal frame 50 supporting the seat 42 is attached to the carrier tube 48. The bucket seat 42 may be adjusted forward and rearward on the frame 50, and is conventional in automobile seats and not illustrated in detail, and the seat may be secured in or released from an adjusted position by means of a lever 52.

Figure 9:
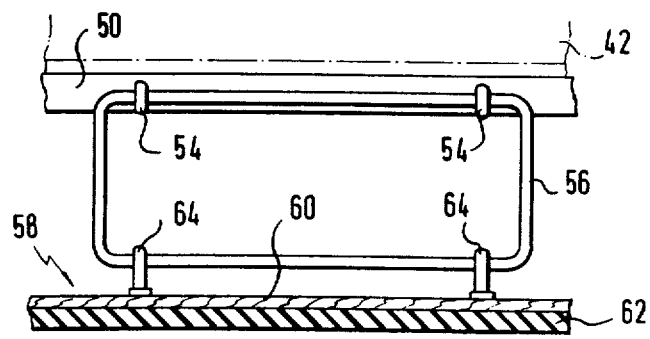
FIG. 9 shows the portion of the cart of FIG. 1 indicated by arrow IX in enlarged front elevation, partly in section.

A braking member 58 is suspended from the seat frame 50 as is best seen in FIG. 9. Eyes 54 on the seat frame 50 pivotally receive a rectangular wire frame 56 which is elongated transversely to the normal direction of cart travel. The frame 56 also passes through corresponding eyes 64 on the wooden backing plate 60 of the braking member. A rubber pad 62 is fastened to the underside of the plate 60 for braking engagement with the surface over which the cart travels. The tapering front end of the plate 60 slopes upward toward a hinge 66 on the frame element 2.

Figure 5:
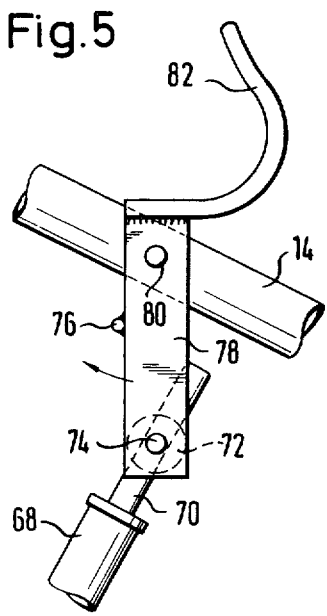
FIG. 5 is an enlarged view of the portion of the cart indicated by a chain-dotted circle V in FIG. 1.
Figure 6:
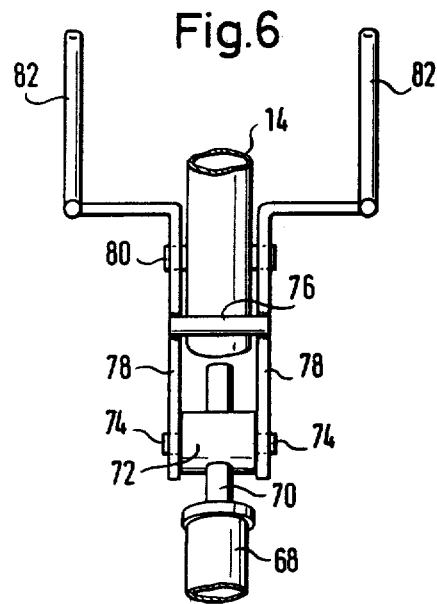
FIG. 6 shows the device of FIG. 5 in rear elevation.

A tubular coupling rod 68, fixedly attached to the plate 62 in the median plane of the cart, extends upward and slightly forward from the plate. Its reduced upper end 70, best seen in FIGS. 5 and 6, is slidably received in a cylinder 72. Trunnions 74 pivotally fasten the cylinder 72 in a bracket consisting of two L-shaped members 78 fixedly connected by a strap 76 and attached to the bumper part 14 by a pivot pin 80. The shorter legs of the members 78 carry hooks 82 on either side of the upright median plane of the cart.

A heavy tube 84 depends in that plane from the junction 12 of the struts 10 in a downward and slightly forward direction. It is connected to the horizontal lower portion of the bumper 18 by an oblong ring 86 from which longitudinally aligned stub shafts 88, 90 project into the lower end of the tube 84 and into a short tube 92 on the bumper portion 18. A rubber cushion 93 in the tube 92 and a helical compression spring 94 in the tube 84 resiliently oppose longitudinal movement of the shafts 88, 90, and a rubber cushion 98 on a rod 96 limits movement of the shaft 88 inward of the tube 84. The upper ends of the spring 94 and of the rod 96 are longitudinally secured in the tube 84 in a manner not specifically shown.

The ring 86 and its stub shafts 88, 90 are parts of a universal joint for the front wheels 102 of the cart. A transverse tube 100 is secured in the ring 86 by trunnions 104 whose common axis is located in the median plane of the cart and slopes forward and upward at a small acute angle when the wheels 102 are set for straight travel.

Figure 7:
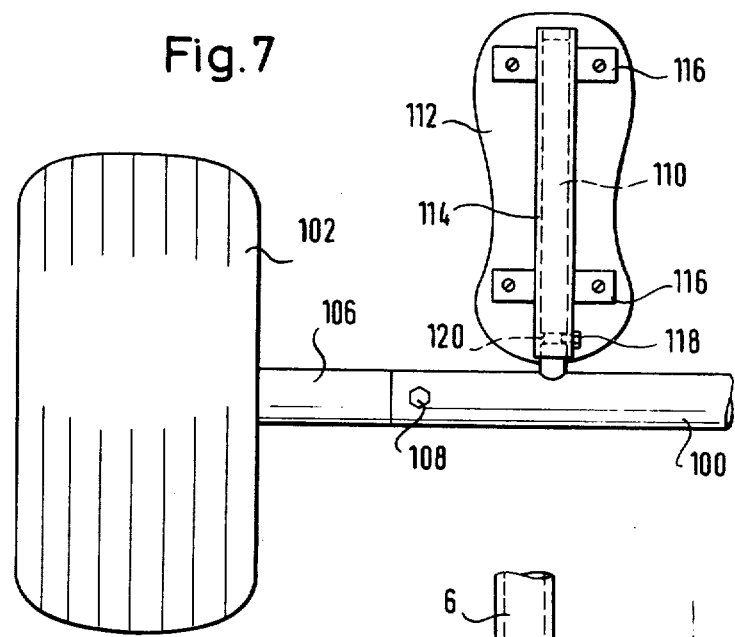
FIG. 7 is an enlarged portion of the front elevational view of FIG. 3.

The wheels 102 are mounted on nylon stub shafts 106 secured in the ends of the transverse tube 100 by pins 108, as is best seen in FIG. 7. Supporting rods 110 are fixedly fastened to the tube 100 on either side of the ring 86 and extend obliquely upward and forward from the tube 100. Two pedal plates 112 carry longitudinal tubes 114, fastened to the undersides of the plates 112 by straps 116 and movably receiving respective rods 110. A set screw 118 in each tube 114 engages a circumferential groove 120 in the associated rod 110 to secure the pedal plate 112.

When the driver occupies the seat 42 and places his feet against the pedal plates 112, he normally tilts the seat 42 backward into the position shown in FIG. 1 in chain-dotted lines, thereby holding the brake member 58 off the ground. The driver steers the cart by pressure applied to the plates 112 to turn the front axle assembly as indicated by arrows 132 in FIG. 2, and he can apply the brake member 58 by leaning forward in the seat 42 or by otherwise shifting his weight forward, and release the brake by leaning back.

When it is desired to tow the cart to its starting position, a ring 122 at the end of a rope 124, shown in phantom view in FIG. 1, is slipped over the hooks 82. Tension applied to the rope cannot swing the hooks 82 from the operative position shown in FIG. 1 in chain-dotted lines against the will of the driver. When he briefly leans forward, the hooks are turned into the fully drawn position, thereby releasing the ring 122.

In the modified cart partly illustrated in FIGS. 10 and 11, and identical with the afore-described embodiment as far as not illustrated, the U-shaped, normally horizontal, main frame element 202 is extended rearward by nylon rods 301 partly inserted into the leg portions of the element 202 and reinforced by a molded-in leaf spring 302. Typically, the height of the spring 302 in the plane of FIG. 10 may be 3 mm, its width, at right angles to FIG. 10, 10 mm. A rivet 306 secures associated ends of the spring 302 and of the enveloping nylon rod 301 to the frame element 202. Another rivet 304 secures the other ends to a short tube 227 on the transverse frame member 226 whose ends carry the rear wheels 232, the tube 227 and the nylon rod 301 being longitudinally aligned with the associated leg portion of the frame element 202.

Short, upright tubes 204 on the frame element 202 receive a roll-over bar 206 substantially as described with reference to FIG. 1. A pneumatic spring 234 is arranged in a common upright plane with each nylon rod 301. A lug 308 attached to the transverse frame member 226 and the tube 227 is connected to the cylinder of the spring 234 by a pivot pin 312. A pivot pin 314 secures the piston rod of the spring to a lug 310 on the roll-over bar 206.

In the modified front axle assembly illustrated in FIG. 11, a normally horizontal pipe 320 is welded to the bight portion of the horizontal main frame element 202 in the upright median plane of the cart. A pipe 322 is welded to the front bumper portion 218 in longitudinal alignment with the pipe 320. Downwardly open, longitudinal slots 324, 325 in the free ends of the pipes 320, 322 are each flanked by two lugs 329, 330 on the slotted pipe ends. Clamping screws 332, 334 permit the slotted pipe ends to be tightened about equally slotted brass bushings 336, 338 in the pipes 320, 322. The bushings are fastened in the respective pipes by hard soldering.

A casing 340 of approximately cubical overall shape is pivotally mounted in the bushings 336, 338 by means of trunnions 360, 362. An upright pivot pin 342 is axially secured in the casing 340 by means of its head and a spring washer 346 at one axial end, and by a spring washer 344, a nut 348, and a cotter pin 350 at its other end. The tubular front axle 300 of the cart is mounted on the pin 342 between two rubber bumpers 352, 354 protected by metal washers. The longitudinally central portion of the axle 300 in and adjacent the casing 340 is reinforced by a mating nylon core 356, approximately 10 cm long. The front wheels 303 are mounted on the two ends of the axle 300.

FIG. 11 also shows elements of the brake assembly of the modified cart, the backing plate 259 being attached to the frame element 202 in the median plane of the cart by a hinge 266. The lower end of the bumper portion 218 is fastened to the frame element 202 by a bracket 220 and a pin 222, substantially as described with reference to FIG. 1.

In both embodiments of the invention, the front axles are pivotally secured to the cart frames for movement about each of two axes transverse to each other in the upright median plane of the cart. The front axle is turned about the approximately upright, common axis of the stub shafts 88, 90 or about the corresponding axis of the pivot pin 342 by the feet of the driver pressing the pedal plates 112. The front axles are turned about the approximately horizontal, common axis of the trunnions 104 or 360, 362 when only one of the front wheels 102, 303 runs over an obstacle.

The rod 68 couples the braking member 58 to the hooks 82, and thus indirectly to the seat 42, but it will be appreciated that an equivalent coupling may directly connect the hook to the seat 42 for control by the driver without any need for the driver to take his hands off the handle bars 16.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A cart comprising:
 a. a frame having a median plane upright in the normal operating condition of the cart;

b. a plurality of wheels rotatably mounted on said frame for engagement with a surface on which the cart travels;

c. a driver's seat mounted on said frame for tilting movement about an axis transverse to said plane, said seat facing in a forward direction;

d. a hook mounted on said frame and spaced from said seat in a forward direction; and e. coupling means coupling said hook to said seat for pivotally moving the hook between an inoperative position and an operative position during said tilting movement.

2. A cart as set forth in claim 1, further comprising brake means operable for braking travel of said cart, and motion transmitting means interposed between said seat and said brake means for operating the brake means in response to said tilting movement of said seat.

3. A cart as set forth in claim 2, wherein said brake means include a brake member mounted on said frame for pivoting movement in said plane about an axis forwardly spaced from said seat toward and away from a position of braking engagement with said surface.

4. A cart comprising:

a. a frame having a median plane upright in the normal operating condition of said cart;

b. a driver's seat mounted on said frame for tilting movement about an axis transverse to said plane, said seat facing in a forward direction;

c. a front axle;

d. pivot means securing said front axle to said frame for movement about each of two axes transverse to each other in said median plane;

e. two front wheels forwardly spaced from said seat and mounted on said front axle on respective sides of said plane;

f. a rear wheel mounted on said frame and rearwardly spaced from said seat,
 1. said wheels being rotatably connected to said frame for engagement with a surface on which the cart travels; and g. brake means on said frame responsive to said tilting movement for braking said cart.

5. A cart as set forth in claim 4, further comprising two elongated supporting members mounted on said front axle on respective sides of said plane, said supporting members extending from said axle obliquely forward and upward, and a pedal mounted on each supporting member and facing said seat.

6. A cart comprising:

a. a frame having a median plane upright in the normal operating condition of said cart;

b. a plurality of wheels rotatably mounted on said frame for engagement with a surface on which the cart travels;

c. a driver's seat mounted on said frame for tilting movement about an axis transverse to said plane;

d. an axle interposed between said frame and each of said wheels, at least one of said axles having a portion of yieldably resilient material; and e. brake means on said frame responsive to said tilting movement for braking said cart.

7. A cart as set forth in claim 6, wherein an associated one of said wheels is rotatably mounted on said portion of said one axle.

8. A cart comprising:

a. a frame having a median plane upright in the normal operating condition of said cart;

b. a plurality of wheels rotatably mounted on said frame for engagement with a surface on which the cart travels;

c. a driver's seat facing in a forward direction and mounted on said frame for tilting movement about a first axis transverse to said plane;

d. a braking member mounted on said frame for pivotal movement about a second axis transverse to said plane;
 1. said second axis being offset from said seat in said forward direction,
 2. said braking member having a portion remote from said second axis and located below said seat; and e. motion transmitting means interposed between said seat and said braking member for causing movement of said remote portion about said second axis and downwardly away from said seat for braking engagement of said braking member with said surface in response to forward tilting movement of said seat,
 1. said motion transmitting means including a linkage having respective terminal portions secured to a part of said braking member rearwardly offset from said second axis and to a part of said seat forwardly offset from said first axis.

* * * * *